United States Patent Office 2,997,461
Patented Aug. 22, 1961

2,997,461
CERTAIN OXYALKYLATED AMINE-MODIFIED THERMOPLASTIC PHENOL-ALDEHYDE RESINS AND METHOD OF MAKING SAME
Melvin De Groote, St. Louis, Mo., assignor to Petrolite Corporation, Wilmington, Del., a corporation of Delaware
Original application Aug. 6, 1954, Ser. No. 448,174, now Patent No. 2,854,416, dated Sept. 30, 1958. Divided and this application Apr. 10, 1957, Ser. No. 651,849
5 Claims. (Cl. 260—51)

This application is a division of my copending application Serial No. 448,174, filed August 6, 1954.

My invention is concerned with new chemical products or compounds useful as demulsifying agents in processes or procedures particularly adapted for preventing, breaking or resolving emulsions of the water-in-oil type and particularly petroleum emulsions. My invention is also concerned with the application of such chemical products or compounds in various other arts and industries as well as with methods of manufacturing the new chemical products or compounds which are of outstanding value in demulsification.

Attention is directed to my co-pending applications, Serial Numbers 288,742, through 288,746, inclusive, filed May 19, 1952, all now abandoned. The first of said co-pending applications relates to a process of condensing certain phenol-aldehyde resins derived from phenols having a functionality not greater than 2, therein and hereinafter described in detail, with certain basic non-hydroxylated secondary monoamines, also therein described in detail, and formaldehyde.

The second application is similar to the first except that the monoamines employed as reactants ar hydroxylated instead of being nonhydroxylated. The third application is similar to the first one insofar that non-hydroxylated polyamines are employed as reactants. The fourth application is concerned with hydroxylated polyamines as reactants and the last application is concerned with amines having a cyclic amidine group in the reactant regardless of whether it is hydroxylated or not.

Attention is also directed to my copending application Serial No. 448,173, filed August 6, 1954, which describes condensation products formed by condensing certain phenol-aldehyde resins which are tetrafunctional towards formaldehyde and are therein and hereinafter described in detail, with certain basic secondary amines, also therein and hereinafter described in detail, and formaldehyde.

Thus the condensation products of copending application Serial No. 448,173 are differentiated from those of the aforementioned five applications in that the resin employed instead of being difunctional towards formaldehyde is tetrafunctional towards formaldehyde.

The present invention is directed to the process of preparing and the products obtained by oxyalkylating with ethylene oxide, propylene oxide, glycide or methyl glycide, the condensation products described in application Serial No. 448,173, i.e. those of certain phenol-aldehyde resins which are tetrafunctional towards formaldehyde, certain basic secondary amines, and formaldehyde.

The manufacture of oxyalkylation-susceptible, fusible, organic solvent-soluble water-insoluble, low-stage phenol aldehyde resins having an average molecular weight corresponding to at least 3 and not over 6 phenolic nuclei per resin molecule and obtained without the use of a bisphenol have been described in a large number of patents including among others, U.S. 2,499,367, dated March 7, 1950, to De Groote and Keiser. Similarly oxyalkylation-susceptible, fusible, organic solvent soluble, water-insoluble phenol aldehyde resin derived by reaction between an aldehyde having but one functional group reactive with bisphenol and a difunctional bisphenol reactive towards aldehydes has been described in U.S. Patent No. 2,564,191, dated July 14, 1951.

As far as I am aware there is no suitable description of a phenol aldehyde resin derived from two classes of phenols, one being a phenol of the formula in which R is an aliphatic hydrocarbon radical having at least 4 and not more than 24 carbon atoms and substituted in the 2,4,6 position; the other being a tetrafunctional bisphenol; the ratio of the two classes of phenols employed being so as to contribute one bisphenol residue per resin molecule and particularly as employed in the present invention as a reactant. The nature of the condensate as obtained by the present manufacturing process is best understood by referring to comparable products derived from a difunctional resin rather than a tetrafunctional resin. In this instance functionality refers to reactivity toward formaldehyde or its equivalent.

For purpose of illustration it may be simpler to divert momentarily to the products described in the five aforementioned co-pending applications, Serial Nos. 288,742 through and including 288,746, inclusive, and for sake of simplicity to the first one, i.e., Serial No. 288,742, in which the amine reactant is a nonhydroxylated monoamine. For purpose of simplicity the invention described in said co-pending application, Serial No. 288,742, may be exemplified by an idealized formula, as follows:

in which R represents a hydrocarbon substituent generally having 4 and not over 18 carbon atoms but most preferably not over 14 carbon atoms and $n$ generally is a small whole number varying from 1 to 4. In the resin structure it is shown as being derived from formaldehyde although obviously other aldehydes are equally satisfactory. The amine residue in the above structure is derived from a basic amine, and usually a strongly basic amine, and may be indicated thus:

in which R' represents any appropriate hydrocarbon radical, such as an alkyl, alicyclic, arylalkyl radical, etc., free from hydroxyl radicals. The only limitation is that the radical should not be a negative radical, which considerably reduces the basicity of the amine, such as an aryl radical or an acyl radical. Needless to say, the two occurrences of R' may jointly represent a single divalent radical instead of two monovalent radicals. This is illustrated by morpholine and piperidine. The introduction of two such amino radicals into a comparatively small resin molecule, for instance, one having 3 to 6 phenolic nuclei as specified, alters the resultant product in a number of ways. In the first place, a basic nitrogen atom, of course, adds a hydrophile effect; in the second place, depending on the size of the radical R', there may be a counterbalancing hydrophobe effect or one in which the hydrophobe effect more than counterbalances the hydrophile effect of the nitrogen atom. Finally, in such cases where R' contains one or more oxygen atoms, another effect is introduced, particularly another hydrophile effect.

Such condensates, i.e., the condensates of Serial No. 288,742, and in fact the instant condensates, are obtained from conventional phenol-aldehyde resins. It is well known that one can readily purchase on the open market, or prepare fusible, organic solvent-soluble, water-insoluble resin polymers of a composition approximated in an idealized form by the formula In the above formula $n$ represents a small whole number varying from 1 to 6, 7 or 8, or more, up to probably 10 to 12 units, particularly when the resin is subjected to heating under a vacuum as described in the literature. A limited sub-genus is in the instance of low molecular weight polymers where the total number of phenol nuclei varies from 3 to 6, i.e., $n$ varies from 1 to 4; R represents a hydrocarbon substituent, generally an alkyl radical having from 4 to 14 carbon atoms, such as a butyl, amyl, hexyl, decyl, or dodecyl radical. Where the divalent bridge radical is shown as being derived from formaldehyde it may, of course, be derived from any other reactive aldehyde having 8 carbon atoms or less.

Reference is now being made to the accompanying drawing in which.

The other figures in the drawing, to wit, 2, 3 and 4, depict in a similar manner resins of the kind herein employed in which one tetrafunctional bisphenol has entered into the resin structure and again the letter R has its prior significance and again the arrows indicate four points of reactivity. Obviously ortho substituted phenols could be employed as well as parasubstituted phenols.

Figure 1:
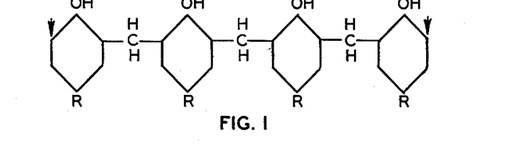
FIGURE 1 depicts a conventional resin of the kind referred to in my co-pending applications Serial Nos. 288,742 through 288,746, dated May 19, 1952. In the drawing R simply denotes an alkyl radical having from 4 to 24 carbon atoms and the arrows indicate two points of reactivity towards formaldehyde. Needless to say, such resins can be obtained from any difunctional phenol and not necessarily a parasubstituted phenol.
Figure 2:
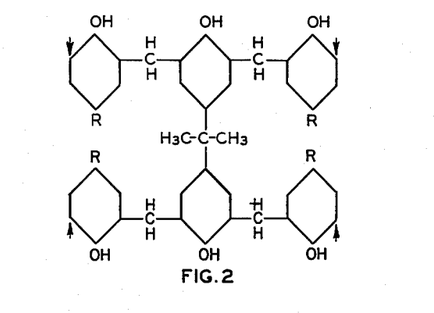
Figure 3:
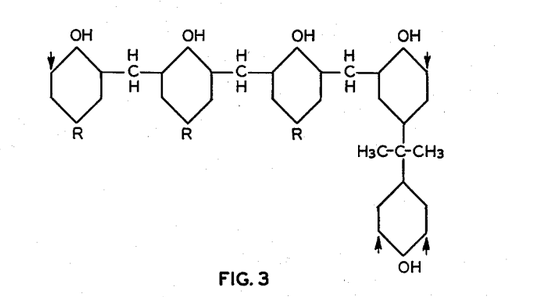
Figure 4:
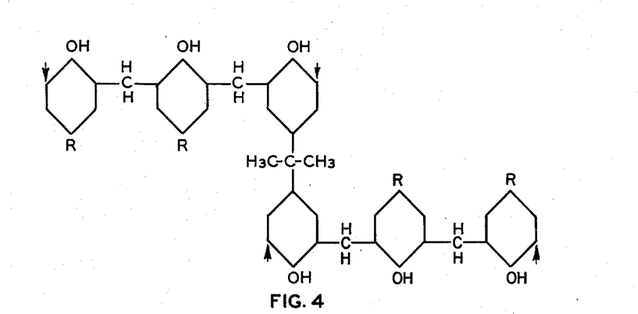

It is obvious that with difunctional resins the most one could combine is one or two moles of a suitable amine whereas in the use of resins herein described one could substitute not only one or two but as many as three or four and thus obtain products of an entirely different character and particularly have an increased hydrophile property in many instances.

Reverting again to what is said in the five copending applications previously referred to, and particularly to Serial No. 288,742, reference is made to the text which describes other products of reaction which appear in the cogeneric mixture resulting from reaction between the resin, the secondary amine and formaldehyde. The reference is as follows:

"In conducting reactions of this kind one does not necessarily obtain a hundred percent yield for obvious reasons. Certain side reactions may take place. For instance, 2 moles of amine may combine with one mole of the aldehyde or only one mole of the amine may combine with the resin molecule, or even to a very slight extent, if at all, 2 resin units may combine without any amine in the reaction product, as indicated in the following formulas:

When a difunctional resin is replaced by a tetrafunctional resin in light of what has been said it becomes apparent that when a tetrafunctional resin molecule replaces a difunctional resin molecule and particularly when the amount of formaldehyde and the amount of amine is increased to 3 or 4 mols per mol of resin a much more complicated and different structure results. Furthermore, to the extent that a molcular weight determination or an approximation thereof can be made the indications point to distinctly higher molecular weights than in the case of difunctional resins. In any event, the condensates so obtained are different in character and for some purposes particularly after oxyalkylation with ethylene oxide, propylene oxide, butylene oxide, glycide, or methylglycide are especially effective for the resolution of petroleum emulsions. Indeed, in many instances the oxyalkylation derivatives are distinctly more effective than the comparable products derived from condensates in which difunctional resins are used."

The products obtained by oxyalkylation with a monoepoxide such as ethylene oxide, propylene oxide, butylene oxide or the like, can be subjected to further reaction with a product having both a nitrogen group and 1,2-epoxy group, such as 3-dialkylaminoepoxypropane. See U. S. Patent No. 2,520,093, dated August 22, 1950, to Gross.

The new products are useful as wetting, detergent, and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetic, spray oils, water-repellent textile finishes; as lubricants, etc.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethyleneglycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

Reference is made again to U.S. Patent No. 2,499,368, dated March 7, 1950, to De Groote and Keiser. Attention is directed to that part of the text which appears in columns 28 and 29, lines 12 through 75, and lines 1 through 21, respectively. Reference is made to this test with the same force and effect as if it were herein included. This, in essence, means that the preferred product for resolution of petroleum emulsions of the water-in-oil type is characterized by the fact that a 50–50 solution in xylene, or its equivalent, when mixed with one to three volumes of water and shaken will produce an emulsion.

For purpose of convenience, what is said hereinafter will be divided into six parts:

Part 1 is concerned with phenol-aldehyde resins suitable for condensation;

Part 2 is concerned with suitable secondary amines which can be employed in conjunction with the resins in the condensation procedure;

Part 3 is concerned with the condensation procedure as such;

Part 4 is concerned with reactions involving the intermediates obtained in the manner described in Part 3, preceding, and certain alpha-beta monoepoxides having not over 4 carbon atoms;

Part 5 is concerned with the resolution of petroleum emulsions of the water-in-oil type by means of the previously described chemical compounds of reaction products; and Part 6 is concerned with the uses for the products herein described, either as such or after modification, including any applications other than those involving resolution of petroleum emulsions of the water-in-oil type.

PART 1

This is concerned with the preparation of phenol-aldehyde resins of the kind previously referred to, i.e., oxyalkylation-susceptible, fusible, organic solvent-soluble, water-insoluble, low-stage phenol-aldehyde resins having an average molecular weight corresponding to at least 3 and not over 6 phenolic nuclei per resin molecule; said resin being derived by reaction between an aldehyde having not over 8 carbon atoms and reactive towards two classes of phenols, one being (A) a phenol of the formula in which R is an aliphatic hydrocarbon radical having at least 4 and not more than 24 carbon atoms and substituted in the 2,4,6 position; the other being (B) a tetrafunctional bisphenol; the ratio of the two classes of phenols employed being so as to contribute one bisphenol residue per resin molecule;

The method employed for preparation of such resin is identical with that described in regard to the preparation of resins obtained solely from difunctional phenols as referred to in U.S. Patent No. 2,499,367 or resins obtained from difunctional bisphenols as described in U.S. Patent No. 2,564,191.

In either event one can prepare the resin with or without the use of a catalyst. The catalyst may be acid or basic. An acid catalyst such as sulfonic acid is preferred. In the present instance the difunctional phenol as differentiated from the bisphenol may have as many as 24 carbon atoms substituted in either the ortho or para position. For practical purposes those having 4 to 14 carbon atoms in the side chain are most suitable. There may or may not be a meta-substituent present. The ordinary phenols used are butylphenol, amylphenol, hexylphenol, octylphenol, nonylphenol, decylphenol, dodecylphenol, and tetradecylphenol. Generally, these are para substituted phenols and have no substituent in the meta position. Substituents may vary in structure as for example, the butyl group may be secondary or tertiary and the amyl group may also be secondary or tertiary. Such resins can be prepared with or without the use of a solvent, but for most purposes it is preferable to have a solvent present. The aldehyde used may be any aldehyde having not over 8 carbon atoms and particularly formaldehyde, acetaldehyde, propionaldehyde or butyraldehyde.

Resins of the kind herein described, i.e., tetrafunctional resins having 3 to 6 phenolic nuclei, one of which is a bisphenol nucleus per resin molecule have not been suitably described but the method of manufacture used in connection with the preparation of other comparable resins is entirely suitable.

For instance see U.S. Patent No. 2,499,368, dated March 7, 1950, to De Groote and Keiser. Resins can be made using an acid catalyst or basic catalyst or a catalyst showing neither acid nor basic properties in the ordinary sense, or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although I have found that sometimes the reactions described involving amines proceeded more rapidly in the presence of a small amount of free base. The amount may be as small as a 200th of a percent and as much as a few tenths of a percent. Sometimes moderate increase in caustic soda and caustic potash may be used. However, the most desirable procedure in practically every case is to have the resin neutral, except for the basicity of the amino groups, of the added reactant in the second step.

In preparing resins one does not get a single polymer, i.e., one having just 3 units, or just 4 units, or just 5 units, or just 6 units, etc. It is usually a mixture; for instance one approximating 4 phenolic nuclei will have some trimer and pentamer present. Thus, the molecular weight may be such that it corresponds to a fractional value form as, for example, 3.5, 4.5, and 5.2.

In the present instance one follows such well-known procedure but makes a mixture of part of the bisphenol with 2, 3, 4, or 5 parts of a difunctional phenol. The difunctional phenol employed may need not be necessarily the same and for that matter one could employ ortho substituted and para-substituted phenols. Resinification is carried along until the usual methods of molecular weight determination indicates a molecular weight corresponding to a combination of the tetrafunctional bisphenol with an equivalent amount of difunctional phenols, for instance a molecular weight corresponding to one mole of a tetrafunctional phenol and 2 moles of a difunctional phenol or a 1 and 3 combination or a 1 and 5 combination.

Bisphenols are well known and the most common example and in fact the only one produced on a large commercial scale, is bisphenol A which is dihydroxydiphenyl-dimethylmethane. The word "bisphenol" is used in the same sense as it is used in U.S. Patent No. 2,506,486, dated May 2, 1950 to Bender, et al. As stated in that patent:

"By terms 'diphenol,' 'diphenylol,' 'bisphenol' and 'dihydroxydiphenyl' as used herein is meant the dihydroxydiphenylmethanes, including the isomers, homologs and substiuted dihydroxydiphenylmethane compounds all as set forth above. Unless the positions of the phenolic hydroxyl groups are otherwise specifically indicated, it is to be understood that they are in the 4,4′(para, para′) positions on the phenyl rings."

In the instance case, however, bisphenols are limited to tetrafunctional bisphenols and for practical purposes this means bisphenols in most instances in which all four ortho groups are not substituted. Examples of such bisphenols are the following:

Comparable bisphenols can be obtained using meta cresol as the initial reactant instead of phenol. A variety of other comparable diphenols are well-known as for example a diphenol of the following formula where R is a small alkyl group having over 8 carbon atoms. For practical purposes, however, the most satisfactory bisphenol is phenol A, equally satisfactory is bisphenol B which has the following formula Some other comparable bisphenols are available.

At least one and in some instances two meta-substituted methyl radicals appear. As to other bisphenols some of which are suitable for the instant purpose, i.e., are tetrafunctional see U.S. Patents Nos. 2,482,728, 2,575,558, 2,626,939, 2,530,353.

As to the preparation of resins one can use the procedure as outlined in Example 1a in aforementioned U.S. Patent No. 2,499,370. One can use any of the difunctional phenols described in said patent and furthermore one can use any of the aldehydes employed and also any of the catalyst and any of the solvents. For purpose of convenience, what is said hereinafter will be limited largely to the use of formaldehyde particularly the 37% formaldehyde solution and the use of an acid catalyst along with xylene or similar solvent. Using the same procedure as described in connection with example 1a in aforementioned U.S. Patent No. 2,499,370 and using approximately 0.6% of monoalkyl ($C_{10}$–$C_{20}$, principally $C_{12}$–$C_{14}$) benzene monosulfonic acid sodium salt in combination with 1% of HCl as a catalyst, a number of suitable resins have been prepared. Similarly the same procedure but employing 1% of diamylnaphthalene sulfonic acid as a catalyst based on the weight of the reaction mass a number of resins were prepared as described in Table I and Table II immediately following:

TABLE I

| Ex. No. | Bisphenol | Amount, grams | Difunctional phenol | Amount, grams | Diamylnaphthalene sulfonic acid (grams) | Aldehyde | Amount, grams | Solvent | Amount, grams |
|---|---|---|---|---|---|---|---|---|---|
| 1a | A | 114 | p-Tert-amyl | 328 | 6.3 | Form. 37% sol | 203 | High boil. arom. pet. sol | 461 |
| 2a | A | 114 | do | 328 | 6.2 | do | 178 | do | 474 |
| 3a | A | 228 | do | 328 | 8.2 | do | 267 | do | 604 |
| 4a | A | 137 | do | 197 | 4.8 | do | 146 | do | 356 |
| 5a | A | 114 | do | 246 | 5.2 | do | 162 | do | 389 |
| 6a | A | 76 | do | 273 | 5.1 | do | 162 | do | 378 |
| 7a | A | 76 | do | 328 | 6 | do | 189 | do | 443 |
| 8a | A | 228 | do | 164 | 5.3 | do | 146 | do | 414 |
| 9a | A | 57 | do | 164 | 3.0 | Acetal | 55 | Xylene | 256 |
| 10a | A | 57 | do | 164 | 3.3 | Furfural | 108 | do | 292 |
| 11a | A | 57 | do | 164 | 3.4 | Benzalde | 119 | do | 303 |
| 12a | A | 57 | do | 164 | 6.2 | Butyl | 90 | do | 288 |
| 13a | A | 57 | do | 164 | 7.2 | Heptal | 143 | do | 333 |
| 14a | A | 57 | do | 164 | 7.4 | Salicyclic | 153 | do | 357 |
| 15a | A | 228 | do | 164 | 3.3 | Furfural | 113 | do | 315 |
| 16a | A | 57 | do | 164 | 3.5 | Benzald | 133 | do | 365 |
| 17a | A | 76 | Para-cresyl | 144 | 3.6 | Form. 37% | 135 | High boil. arom. pet. sol | 243 |
| 18a | A | 76 | p-Tert-butyl | 200 | 4.1 | do | 135 | do | 300 |
| 19a | A | 76 | Octyl-phenol | 275 | 4.9 | do | 135 | do | 376 |
| 20a | B | 81 | Nonyl-phenol | 295 | 5.0 | do | 135 | do | 396 |
| 21a | C | 85 | o-Tert-amyl | 219 | 6.2 | do | 135 | do | 315 |
| 22a | D | 67 | p-Tert-amyl | 219 | 4.1 | do | 135 | do | 299 |

Bisphenol A is p,p-dihydroxy diphenyl dimethyl methane.
Bisphenol B is the comparable derived from ethyl methyl ketone instead of dimethyl ketone.
Bisphenol C is comparable to bisphenol A but derived from meta-cresol instead of phenol.
Bisphenol D is o,o-dihydroxy diphenyl methane.

TABLE II

| Ex. No. | Molal ratio of bisphenol to difunct. phenol to aldeh. | Mol ratio of water out based on aldehyde [1] | Max. temp. during resinification, °C. | Color | Hardness (solv. free basis) | Theo. molec. weight [2] | Remarks (see note D) |
|---|---|---|---|---|---|---|---|
| 1a | 1:4:5 | 1.02 | 150 | Amber blackish | Hard | 954 | The 50% solution is a soft solid. |
| 2a | 1:4:4.4 | 0.959 | 150 | do | do | 954 | (See note A.) |
| 3a | 1:2:3.3 | 0.994 | 134 | Black (red.) | do | | (See note B.) |
| 4a | 1:2:3 | 0.906 | 155 | Amber (black) | | 590 | 2.7 moles $H_2O$ liber. per mole bisphenol. |
| 5a | 1:3:4 | 0.974 | 150 | Black-purple | Hard | 768 | Viscosity at 95° C.=226 cps.[3] |
| 6a | 1:5:6 | 1.0 | 155 | Black-red | | 1,120 | Viscosity=160 cps. at 80° C.[3] |
| 7a | 1:6:7 | 0.96 | 150 | Black-brown | Hard | 1,296 | |
| 8a | 1:1:1.8 | | 154 | Dark purple | Very hard | | |
| 9a | 1:4:5 | 0.756 | 146 | Dark brown | Hard | 1,014 | (See note C.) |
| 10a | 1:4:4.5 | 0.825 | 145 | do | do | 1,235 | $H_2O$/bisphenol=3.65 moles, reaction time 17.5 hrs. |
| 11a | 1:4:4.5 | 0.975 | 145 | Dark amber | do | 1,279 | $H_2O$/bisphenol=4.4. |
| 12a | 1:4:5 | 0.71 | 149 | Brown (dark) | Sligh. soft | 1,154 | $H_2O$/bisphenol=3.55, reaction time 17.5 hrs. |
| 13a | 1:4:5 | 0.957 | 148 | Dark brown | Hard | 1,366 | $H_2O$/bisphenol=4.77. |
| 14a | 1:4:5 | 0.845 | 150 | do | do | 1,406 | $H_2O$/bisphenol=4.22, reaction time 17.5 hrs. |
| 15a | 1:4:5 | 0.977 | 147 | do | do | 1,246 | $H_2O$/bisphenol=0.984. |
| 16a | 1:4:5 | 0.956 | 145 | Dark amber | do | 1,326 | $H_2O$/bisphenol=4.77. |
| 17a | 1:4:5 | 0.833 | 158 | Dark brown | do | 720 | $H_2O$/bisphenol=4.17. |
| 18a | 1:4:5 | 0.833 | 156 | do | do | 888 | Do. |
| 19a | 1:4:5 | 0.85 | 153 | do | do | 1,013 | $H_2O$/bisphenol=4.18. |
| 20a | 1:4:5 | 0.8 | 155 | Dark amber | do | 1,187 | $H_2O$/bisphenol=4. |
| 21a | 1:4:5 | 0.8 | 159 | Dark brown | do | 1,003 | Do. |
| 22a | 1:4:5 | 0.867 | 152 | do | do | 804 | Very hard resin. |

Note A—50% solution is very viscous, but not as much as when HCHO is 5 moles was used. The viscosity of 50% solu. at 100° C.=22 cps.
Note B—Crosslinkage occurred during dehydration HCHO to phenol ratio (1:1.1) is probably too high.
Note C—$H_2O$/bisphenol—3.78 moles. Reaction is very slow. Reaction=25 hours. Thinner solu. than HCHO resin.
Note D—Reaction time in all examples 2 to 3 hours except where otherwise indicated.

[1] It is quite possible that in a molal ratio of 1, 4 and 5 that not more than 4 mols of the aldehyde enters into reaction particularly when an acid catalyst is used. For this reason the value of .8 for example in column 3 corresponding to Examples 20a and 21a may still well be theoretical 100% combination.
[2] Theoretical molecular weight based on the single structural unit.
[3] Viscosity taken as 50% solution in high boiling solvent.

The resins illustrated by Examples 1a through 22a have been prepared using bisphenol B instead of bisphenol A. The products obtained were substantially identical except that they seem to show a little higher oil solubility and less tendency, if any, towards gel formation. The same is true where bisphenol C has been employed. A mixture of materials consisting of 3,5 xylenol, m-ethyl phenol, m-cresol was subjected to reaction with an acetone to give a cogeneric mixture of bisphenols which appear to be perfectly satisfactory when substituted for bisphenol A in the above examples.

PART 2

As noted previously, a variety of secondary amines free from a primary amino group may be employed. These amines fall into five categories, as indicated previously.

One category consists of strongly basic secondary monoamines free from hydroxyl groups whose composition may be indicated thus:

in which R′ represents a monovalent alkyl, alicyclic, arylalkyl radical and may be heterocyclic in a few instances as in the case of piperidine and a secondary amine derived from furfurylamine by methylation or ethylation, or a similar procedure.

Another example of a heterocyclic amine is, of course, morpholine.

The secondary amines most readily available are, of course, amines such as dimethylamine, methylethylamine, diethylamine, dipropylamine, ethylpropylamine, dibutylamine, diamylamine, dihexylamine, dioctylamine, and dinonylamine. Other amines include bis(1,3-dimethylbutyl) amine. There are, of course, a variety of primary amines which can be reacted with an alkylating agent such as dimethyl sulfate, diethyl sulfate, an alkyl bromide, an ester of sulfonic acid, etc., to produce suitable amines within the herein specified limitations. For example, one can methylate alphamethylbenzylamine, or benzylamine itself, to produce a suitable reactant. Needless to say, one can use secondary amines such as dicyclohexylamine, dibutylamine or amines containing one cyclohexyl group and one alkyl group, or one benzyl group and one alkyl group, such as ethylcyclohexylamine, ethylbenzylamine, etc.

Other suitable compounds are exemplified by (C$_2$H$_5$OC$_2$H$_4$OC$_2$H$_4$)$_2$NH
(C$_8$H$_{17}$OC$_2$H$_4$OC$_2$H$_4$OC$_2$H$_4$)$_2$NH
(C$_4$H$_9$OCH$_2$CH(CH$_3$)O(CH$_3$)CHCH$_2$)$_2$NH
(CH$_3$OCH$_2$CH$_2$OCH$_2$CH$_2$OCH$_2$CH$_2$)$_2$NH
(CH$_3$OCH$_2$CH$_2$CH$_2$CH$_2$CH$_2$CH$_2$)$_2$NH Other somewhat similar secondary amines are those of the composition as described in U.S. Patent No. 2,375,659, dated May 8, 1945, to Jones et al. In the above formula R may be methyl, ethyl, propyl, amyl, octyl, etc.

Other amines can be obtained from products which are sold in the open market, such as may be obtained by alkylation of cyclohexylmethylamine or the alkylation of similar primary amines, or for that matter, amines of the kind described in U.S. Patent No. 2,482,546, dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and beta-phenoxypropylamine.

Other suitable amines are the kind described in British Patent No. 456,517 and may be illustrated by

C$_{12}$H$_{25}$—O—CH$_2$—CH$_2$—O—CH$_2$—CH$_2$—NH—CH$_3$

The secondary category represents secondary amines which are hydroxylated monoamines. These may be illustrated by diethanolamine, methylethanolamine, dipropanolamine, dibutanolamine and ethylpropanolamine. Suitable primary amines which can be so converted into secondary amines include butylamine, amylamine, hexylamine, higher molecular weight amines derived from fatty acids, cyclohexylamine, benzylamine, furfurylamine, etc.

Other suitable amines include 2-amino-1-butanol-2-amino-2-methyl-1-propanol, 2-amino-2-methyl,1,3-propanediol, 2-amino-2-ethyl-1,3-propanediol, and tris-(hydroxylmethyl)-aminoethane. Another example of such amines is illustrated by 4-amino-4-methyl-2-pentanol.

Other suitable compounds are the following:

or comparable compounds having two hydroxylated groups of different lengths as in Other examples of suitable amines include alpha-methylbenzylamine and monoethanolamine; also amines obtained by treating cyclohexylmethylamine with one mole of an oxyalkylating agent as previously described; beta-ethylhexylbutanolamine, diglycerylamine, etc. Another type of amine which is of particular interest because it includes a very definite hydrophile group includes sugar amines such as glucamine, galactamine and fructamine, such as N-hydroxyethylfructamine.

Other suitable amines may be illustrated by

See, also, corresponding hydroxylated amines which can be obtained from rosin or similar raw materials and described in U.S. Patent No. 2,510,063, dated June, 1950, to Bried. Still other examples are illustrated by treatment of certain secondary amines, such as the following, with a mole of an oxyalkylating agent as described; phenoxyethylamine, phenoxyalphamethylethylamine, and phenoxypropylamine.

Polyamines free from a hydroxyl group may be illustrated by the following:

The fourth category consists of polyamines having hydroxylated groups which may be characterized by the following:

Suitable cyclic amidines which may or may not have a hydroxyl group but are free from primary amino groups may be illustrated by the following:

2-undecylimidazoline
2-heptadecylimidazoline
2-oleylimidazoline
1-N-decylaminoethyl, 2-ethylimidazoline
2-methyl, 1-hexadecylaminoethylaminoethylimidazoline
1-dodecylaminopropylimidazoline
1-(stearoyloxyethyl)aminoethylimidazoline
1-stearamidoethylaminoethylimidazoline
1-(N-dodocyl)-acetamidoethylaminoethylimidazoline
2-heptadecyl, 4,5-dimethylimidazoline
1-dodecylaminohexylimidazoline
1-stearoyloxyethylaminohexylimidazoline
2-heptadecyl, 1-methylaminoethyl tetrahydropyrimidine
4-methyl, 2-dodecyl, 1-methylaminoethylaminoethyl tetrahydropyrimidine As to hydroxylated reactants all that is required is to employ a suitable compound having a 5-membered ring or after being subjected to oxyalkylation with ethylene oxide or the like. Thus, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as 2-heptadecyl, 1-aminoethylimidazoline which can be reacted with a single mole of ethylene oxide, for example to produce the hydroxy ethyl derivative of 2-heptadecyl, 1-aminoethylimidazoline, which can be illustrated by the following formula Other reactants may be employed in connection with an initial reactant of the kind described above, to wit, 2-heptadecyl, 1-aminoethylimidazoline; for instance, reaction with an alkylene imine such as ethylene imine, propylene imine, etc. If reacted with ethylene imine the net result is to convert a primary amino radical into a secondary amino radical and also introduces a new primary amine group. If ethylene imine is employed, the net result is simply to convert 2-heptadecyl, 1-aminoethylimidazoline into 2-heptadecyl, 1-diethylenediaminoimidazoline. However, if propylene imine is used the net result is a compound which can be considered as being derived hypothetically from a mixed polyalkylene amine, i.e., one having both ethylene groups and a propylene group between nitrogen atoms.

PART 3

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

The herein described amine-modified resins are obtained from formaldehyde, or in some instances glyoxal and resins of the kind described in Part 1 preceding, in combination with secondary amines. Generally speaking in the preparation of conventional amine-modified resins the object is to obtain a heat-convertible compound or resin or at least heat convertible in presence of added formaldehyde. See, for example, U.S. Patent No. 2,031,557 to Bruson. Since the condensation products obtained in the present invention are not heat-convertible and since temperature up to 150° C. or thereabouts may be employed, it is obvious that the procedure becomes comparatively simple. Indeed, perhaps, no description is necessary over and above what has been previously, in light of subsequent examples. However, for purpose of clarity the following details are included.

A convenient piece of equipment for preparation of these cogeneric mixtures is a resin pot of the kind described in aforementioned U.S. Patent No. 2,499,368. In most instances the resin selected is not apt to be a fusible liquid, but is apt to be a solid at ordinary room temperature. Thus, I have found it convenient to use a solvent and particularly one which can be removed readily at a comparatively moderate temperature, for instance at 150° C. or thereabouts. A suitable solvent is usually benzene, xylene or a comparable petroleum hydrocarbon or a mixture of such or similar solvents. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent of the kind as noted, and it is not necessary to have a single phase system for reaction.

Needless to say, the resins used are tetrafunctional. They could be combined with one mole of an appropriate amine or with 2 moles or with 3 moles or with 4 moles. If combined with one mole, or with 2 moles of an appropriate amine there is no advantage in using the previously described resins over the conventional resins derived from difunctional phenols only. The real advantage is the ability to combine at least 3 and more particularly 4 moles of amine with one mole of a resin having a total of 3 to 6 phenolic nuclei. For this reason the hereto appended claims specifically limit my invention to such combinations where at least 3 moles of appropriate amine is combined with 1 phenolic resin.

In the preparation of resin condensates the aldehydes used are formaldehyde and glyoxal. The use of glyoxal is limited to such compounds wherein insolubility does not occur. Needless to say, when glyoxal is used to obtain substantially the same effect, the molar ratio is cut in two. In the claims reference is made to formaldehyde as such, but obviously where glyoxal can be substituted such products would be within the obvious boundaries of the invention.

Although the condensation reaction can be conducted without the use of a solvent, in fact, it can be conducted using formaldehyde in high concentrations or even the anhydrous equivalent, it is preferred to use the 37% solution and also to use a solvent.

I have found no difficulty in promoting the condensation reaction although at times it is desirable to add sole solvent having a common solvent effect. Thus an oxygenated solvent may or may not be employed. Such solvent may be employed in combination with a hydrocarbon solvent such as xylene. However, if the reaction mass is going to be subjected to some further reaction where the solvent may be objectionable as in the case of ethyl or hexyl alcohol, and if there is to be subsequent oxyalkylation, then, obviously, the alcohols should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost water-white in color, the condensation products obtained are invariably dark and particularly reddish or dark red in color.

In some instances condensates have been prepared using a formaldehyde in one case and glyoxal in the other. Due to the difunctional property of glyoxal the condensate frequently is harder and at times may even be insoluble.

Indeed, depending on the resin selected and the amine selected the condensate product or reaction mass on a solvent-free basis is apt to be harder than the original resin itself. This is particularly true when all the amine hydrogen atoms present in the amine have entered into reaction, as in the case of a polyamine.

The products obtained, depending on the reactants selected, may be water-insoluble, or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

It so happens as will be pointed out that frequently it is convenient to eliminate all solvent using a temperature of not over 150° C. and employing vacuum if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i.e., the use of the most economical solvent and also on three other factors, two of which have been mentioned previously; (a) is the solvent to remain in the reaction mass without removal: (b) is the reaction mass to be subjected to further reaction in which the solvent, for instance, an alcohol, either low boiling or high boiling, might interfere as in the case of oxyalkylation? and the third factor is this (c) is an effort to be made to purify the reaction mass by the usual procedure as, for example, a water-wash to remove any unreacted low molal soluble amine, if employed and present after reaction? Such procedures are well known, and, needless to say, certain solvents are more suitable than others. Everything else being equal, I have found xylene the most satisfactory solvent.

I have found no advantage in using a low temperature, approximately room temperature, at the start of the reaction although this is sometimes done purely as a matter of convenience. Indeed, using formaldehyde I have usually done nothing more than prepare the reaction mixture, add a suitable amount of xylene, and reflux for approximately 1½ to 6½ hours at temperatures varying, as the case may be, from 135° to 160° C. Where the amine has a comparatively low basicity I have sometimes added a small amount of approximately 1% of sodium methylate.

However, using a xylene-benzene mixture, for instance, approximately 17 parts of benzene and 35 parts of xylene, and a phase-separating trap to eliminate water I have found that I could employ temperatures between 90° and 100° C., and eliminate the water of condensation by refluxing at this temperature. However, I have found no particular advantage in using this intermediate temperature over and above the high temperature previously noted.

The only bisphenol commercially available at quantity prices is bisphenol A. The four most readily available difunctional phenols having alkyl groups of at least four carbon atoms or more are: p-tertiary-amyl phenol, p-tertiary-butyl phenol, octyl phenol and nonyl phenol. The cheapest aldehyde and most suitable aldehyde is formaldehyde. For this reason the description of the condensation reaction has been limited to these products which best serve as raw material in actual commercial manufacture. Thus, the resins employed in the subsequent examples and tables are 1a, 18a, 19a and 20a. This latter was made from bisphenol B.

Generally speaking, the preference has been to prepare condensates which had substantial hydrophile properties. This usually means the use of hydroxylated amines or polyamines. Those commercially available and particularly suitable include: diethanolamine, diisopropanolamine, dibutanolamine and the polyamines which have been reacted with approximately 2 mols of an alkylene oxide such as ethylene oxide. Such compounds include among others symmetrical di(hydroxyethyl) ethylene diamine, symmetrical di(hydroxyethyl) diethylene triamine, symmetrical di(hydroxypropyl) ethylene diamine, symmetrical di(hydroxybutyl) ethylene diamine and the comparable products derived from 1,3-diaminopropane. From a practical standpoint most readily available amines include diethanolamine, diisopropanolamine symmetrical di(hydroxyethyl) ethylene diamine, morpholine, etc. Using diamines, and especially a polyamine having a single reactive secondary amino group such as the hydroxyethyl derivative of dimethylamino propylamine obtained by the reaction of one mol of ethylene oxide and one mol of dimethylamino propylamine or the comparable product derived from diethylamino propylamine are particularly suitable. Another particularly suitable amine is alpha-methylbenzyl monoethanolamine.

It is not necessary to point out that in the condensation reaction one may obtain condensates which in all likelihood are monomers particularly when derived from a monoamino reactant such as diethanolamine or diisopropanolamine. On the other hand when derived from diamines in which there are two secondary amino groups available for reaction obviously more complex forms and probably polymers may form. This may apply also where glyoxal is used.

The complexity of structure is increased if one employs a symmetrical substituted polyamine such as di-(hydroxyethyl) diethylenetriamine or triethylenetetramine or symmetrical di(hydroxyethyl) 3,3-iminobispropylamine.

In making a large variety of condensates I employed conventional glass pots with appropriate heating jackets, condensers, and stirrers, etc. These glass pots had a capacity of approximately 5 to 6 liters. The procedure employed is illustrated by the example immediately following:

*Example 1b*

954 grams of the resin identified as 1a was dissolved in approximately 422 grams of xylene. To this was added 420.6 grams of diethanolamine. Aftr mixing at room temperature 324.5 grams of 37% formaldehyde was added slowly and the temperature raised over a period of time to approximately 140° C. and the mixture was allowed to reflux for about 2 to 3 hours. During this period of time water of solution or water of reaction was withdrawn so that the mixture continued to reflux to 148° for another hour. In some instances some xylene was withdrawn and some benzene added to hold the temperature in the approximate 145 to 150° range. Actually, the completion of condensation can be determined readily by continuing until no more water can be separated by means of a conventional phase separating trap. In the final product xylene was returned to the mass if required or if enough of the solvent was distilled out so that the solvent remaining behind was the same as originally added. This was purely for a matter of convenience in order that the mixture as completed contained the same amount of solvent as when it started. In each instance a small amount of sample was heated to eliminate the xylene or other solvent. The resultant product was usually hard or stometimes tacky rather than hard and the color varied from reddish black to almost black. In some instances the condensate was amber or dark brown rather than reddish. The product so obtained could be bleached with the filtering chars or filtering earths. For most purposes, and particularly when used subsequently as chemical reactant, there is no advantage in such bleaching. In such instances where there was a tendency to form insoluble or semi-rubbery masses, there is some advantage in using an oxygen-containing solvent such as the dimethyl ether of diethylene glycol. Such solvent was used to replace the third or fourth of the xylene or benzene.

Similar products were prepared as indicated in the following tables:

TABLE III

| Ex. No. | Resin | Molec. weight | Resin, grams | Amine | Grams | Aldehyde | Grams | Solvent | Grams |
|---|---|---|---|---|---|---|---|---|---|
| 1b | 1a | 954 | 954 | AA | 420.6 | Form. 37% | 324.5 | Xylene | 1,422 |
| 2b | 18a | 888 | 954 | AA | 420.6 | ---do--- | 324.5 | ---do--- | 1,356 |
| 3b | 19a | 1,013 | 954 | AA | 420.6 | ---do--- | 324.5 | ---do--- | 1,481 |
| 4b | 20a | 1,173 | 954 | AA | 420.6 | ---do--- | 324.5 | ---do--- | 1,641 |
| 5b | 1a | 954 | 954 | BB | 532 | ---do--- | 324.5 | ---do--- | 1,534 |
| 6b | 18a | 888 | 954 | BB | 532 | ---do--- | 324.5 | ---do--- | 1,468 |
| 7b | 19a | 1,013 | 954 | BB | 532 | ---do--- | 324.5 | ---do--- | 1,593 |
| 8b | 20a | 1,173 | 954 | BB | 532 | ---do--- | 324.5 | ---do--- | 1,753 |
| 9b | 1a | 954 | 954 | CC | 661 | ---do--- | 324.5 | ---do--- | 1,663 |
| 10b | 18a | 888 | 954 | CC | 661 | ---do--- | 324.5 | ---do--- | 1,597 |
| 11b | 19a | 1,013 | 954 | CC | 661 | ---do--- | 324.5 | ---do--- | 1,722 |
| 12b | 20a | 1,173 | 954 | CC | 661 | ---do--- | 324.5 | ---do--- | 1,882 |
| 13b | 1a | 954 | 954 | DD | 536.8 | ---do--- | 324.5 | ---do--- | 1,539 |
| 14b | 18a | 888 | 954 | DD | 536.8 | ---do--- | 324.5 | ---do--- | 1,473 |
| 15b | 19a | 1,013 | 954 | DD | 536.8 | ---do--- | 324.5 | ---do--- | 1,598 |
| 16b | 20a | 1,173 | 954 | DD | 536.8 | ---do--- | 324.5 | ---do--- | 1,758 |
| 17b | 1a | 954 | 954 | AA | 420.6 | Glyoxal | 378 | ---do--- | 1,423 |
| 18b | 18a | 888 | 954 | BB | 532 | Glyoxal 30% | 378 | ---do--- | 1,468 |

NOTE.—In the above table AA is used to designate diethanolamine; BB is used to designate diisopropanolamine; CC is used to designate alpha methylbenzylmonoethanolamine; DD is used to designate hydroxyethyl dimethylamino propylamine obtained by reaction between 1 mole of ethylene oxide and 1 mole of dimethylamino propylamine.

TABLE IV

| Ex. No. | Molal ratio of reactant resin: amine aldehyde | Water out, grams | Ratio water out to aldehy. present | Reaction data | | | | | Theo. molec. weight per structural unit |
|---|---|---|---|---|---|---|---|---|---|
| | | | | Max. temp. | Time period | Color of product | Char. of solvent-free condensate | | |
| 1b | 1:4:4 | 270.5 | 0.92 | 148 | 2½ | Dk. amber | Hard brittle | | 1,422 |
| 2b | 1:4:4 | 272.4 | 0.95 | 146 | 2¼ | Dk. purple | ----do---- | | 1,356 |
| 3b | 1:4:4 | 269.5 | 0.91 | 149 | 2½ | Dk. amber | ----do---- | | 1,481 |
| 4b | 1:4:4 | 268 | 0.89 | 149 | 3 | Blk. amber | ----do---- | | 1,641 |
| 5b | 1:4:4 | 273 | 0.96 | 144 | 2½ | Dk. amber | ----do---- | | 1,534 |
| 6b | 1:4:4 | 271.7 | 0.94 | 146 | 2½ | ----do---- | ----do---- | | 1,468 |
| 7b | 1:4:4 | 268.8 | 0.90 | 148 | 3 | ----do---- | ----do---- | | 1,593 |
| 8b | 1:4:4 | 269.5 | 0.91 | 145 | 3 | Amber blk. | ----do---- | | 1,753 |
| 9b | 1:4:4 | 267.3 | 0.88 | 147 | 2¾ | Dk. amber | ----do---- | | 1,663 |
| 10b | 1:4:4 | 268.7 | 0.90 | 147 | 2½ | Amber | ----do---- | | 1,597 |
| 11b | 1:4:4 | 271 | 0.93 | 145 | 3 | Dk. amber | ----do---- | | 1,722 |
| 12b | 1:4:4 | 265.2 | 0.85 | 144 | 3¼ | Blk. brown | ----do---- | | 1,882 |
| 13b | 1:4:4 | 266.6 | 0.87 | 147 | 2½ | Very dk. brown | ----do---- | | 1,539 |
| 14b | 1:4:4 | 270.5 | 0.92 | 149 | 2¼ | Dk. amber | ----do---- | | 1,473 |
| 15b | 1:4:4 | 267.3 | 0.88 | 143 | 2¾ | Blk. amber | ----do---- | | 1,598 |
| 16b | 1:4:4 | 264.5 | 0.84 | 146 | 2¾ | Dk. amber | ----do---- | | 1,758 |
| 17b | 1:4:2 | 322 | 0.68 | 144 | 1½ | Dk. brown | Hard | | 1,423 |
| 18b | 1:4:2 | 325 | 0.75 | 142 | 1½ | ----do---- | ----do---- | | 1,468 |

There is no need to conduct the resinification in one piece of equipment and the condensation in another piece of equipment. Condensation in this instance refers to the reaction involving the amine. Of course, resinification in the manufacturing of phenol-aldehyde resins is obviously a condensation reaction. Thus, one can use a large size glass pot about 5 liters' capacity, add the bisphenol such as bisphenol A along with the selected catalyst such as diamyl naphthalene sulfonic acid together with the solvent. Formaldehyde can be added in appropriate fashion. When resinification is complete and water of solution or water of reaction has been withdrawn by means of a phase separating trap the reaction mass can be cooled, and the selected amine such as diisopropanolamine can be added after having previously added sufficient caustic soda to neutralize the sulfonic acid. Formaldehyde can then be added and the second one of the condensation reactions can be conducted in the same equipment and thus simplify manufacturing procedures. Actually, this is the procedure employed on a larger scale in actual manufacture.

It has been previously pointed out that the structure of the condensate may vary considerably and may be monomeric and polymeric. Note also what has been said in the introductory part of the specification in regard to the combinations possible in complexity of the structure of various condensates.

PART 4

At the present time there are available a number of alkylene oxides, particularly ethylene oxide, or propylene oxide and butylene oxide, either as a single isomer or as a mixture of isomers. Glycide is available, or readily prepared. The same applies to methylglycide.

Oxyalkylation with any of the aforementioned alkylene oxides is comparatively simple in light of present day knowledge. In fact, it is stated briefly in U.S. Patent No. 2,636,038, dated April 21, 1953, to Brandner, in the following language: ". . . The compounds . . . are prepared by the addition reaction between alkylene oxides and substituted oxazolines of the group named hereinbefore. The addition reaction is advantageously carried out at elevated temperature and pressure and in the presence of an alkaline catalyst."

As to a more complete description of oxyalkylation procedure reference is made to U.S. Patent 2,629,706, dated February 24, 1953, to De Groote and Keiser. See particularly the subject matter which appears in column 7 of said patent.

Propylene oxide and butylene oxide react somewhat more slowly than ethylene oxide and may require a somewhat higher temperature, somewhat greater agitation, or an increased amount of alkaline catalyst, such as finely powdered sodium hydroxide or sodium methylate. If the product to be subjected to oxyalkylation is xylene-soluble or soluble in any one of a number of inert solvents, there is no particular difficulty involved. The same is true if the product is a liquid at oxyalkylation temperatures. If it is not soluble or a liquid then in some cases initial oxyalkylation can be accomplished by means of an alkylene carbonate, such as ethylene carbonate or propylene carbonate which has a solubility effect as well as acting as an oxyalkylation agent. As soon as a suitable product is obtained by the use of a carbonate further reaction can be completed with the oxide. An alternate procedure sometimes employed with insoluble materials is to reduce the products to an extremely finely ground powder and oxyalkylate during suspension using particularly vigorous agitation.

All these procedures have been described repeatedly in the literature and, as a matter of fact, suitable operational directions are available from any one of several makers of alkylene oxides.

*Example 1c*

Due to their ready availability, the bulk of the oxyalkylation derivatives were prepared from ethylene oxide, propylene oxide, butylene oxide, or a mixture of the same. Generally speaking, the autoclaves or oxyalkylators employed ranged from aprpoximately 2 gallons in size to approximately 20 gallons in size. The general procedure was to start with a fairly small sample; for instance, approximately 2000 grams, of the product to be oxyalkylated and 1000 grams of a solvent such as xylene, or a high-boiling aromatic solvent, or the diethylether of ethyleneglycol, or a mixture of these solvents. Powdered caustic soda, or sodium methylate, were added as a catalyst in an amount generally not over 2%, and more catalyst was added if the amount dropped to ½% or less. Initial oxyalkylation generally started by adding 50% by weight, 100% by weight, 200% by weight, 300% by weight, 500% by weight, etc., until at least ten times as much oxide had been added, at least in some examples. Excellent compounds or suitable raw materials have been obtained by adding as much as 50 parts by weight of oxide to one part of the initial reactant. In some instances the same examples were repeated and then reacted with one or more oxides; for instance, in the table which follows there are examples where an oxyethylated product was oxypropylated subsequently, or vice versa. Comparatively small samples, for instance, one to five grams were taken at various stages and tested for emulsifiability factor and also for demulsifying effect on crude oil emulsions. The tabular data do not reflect the slight discrepancy due to sample withdrawal.

More specifically then, 12 pounds (5,500 grams) of the condensate previously identified as Example 1b, were mixed with an equal weight of solvent (being xylene in this series). The mixture was placed in a small autoclave together with 1.2 pounds of finely powdered caustic soda, and stirred, and the temperature raised to approximately 130° C. 2 pounds (910 grams) of ethylene oxide were added in approximately 15 minutes. The pressure during the oxyalkylation was about 10 to 15 pounds per square inch. The resultant product was a fluid having an amber color. Except for the withdrawal of a few grams for examination, the product was then subjected to further oxyalkylation with another 2.0 pounds of ethylene oxide and without the addition of any more catalyst or any more solvent.

Note what is said in regard to these examples and subsequent examples in the text immediately following, and in the tables.

A number of additional examples appear in tabular form in the five tables immediately following to wit, Tables V, VI, VII, VIII and IX. These are self-explanatory, particularly in regard to the first three tables. The last two require a little more careful examination. This is due to an effort to condense the data and not burden the text with an unduly large volume of detail.

Due to the fact that various size quantities are used the ratios sometimes appear in grams or kilograms and sometimes in pounds. When pounds are used the designation "#" is included.

In Tables IV, V and VI successive stages of oxyalkylation are shown. Small samples of a few grams were withdrawn and tested for solubility and also for demulsification effectiveness.

The withdrawal of such small samples was ignored. In some instances the example was repeated and used subsequently for reaction with one or more other oxides. In some instances the product so obtained in the first stage of oxyalkylation represented a comparatively large quantity and was sub-divided perhaps into one-half or even a smaller fraction, and then this smaller fraction only subjected to oxyalkylation with another oxide. As previously noted, no further explanation is required in regard to the first three tables.

In the fourth table, Table VIII, it is to be noted that Example 1f is derived from Example 8c. Referring to Example 8c it will be noted this was derived originally from oxyalkylation-susceptible compound Example 1b. In Example 8c, oxyalkylation-susceptible compound Example 1b had already been treated with ethylene oxide. Thus, in Table VII, although the oxyalkylation-susceptible compound is properly designated as Example 8c for the reason it is now the reactant subjected to oxypropylation, the oxyalkylation-susceptible compound as far as reference to weight goes (in this instance 4.0 pounds) goes back to the original compound Example 1b. This is obvious, and is even more obvious for the reason that it is subsequently emphasized in connection with the weight ratio, as explained subsequently.

It will be noted also that in the fourth column in Table VIII the oxide used is marked as indicated and in each instance the oxide employed in this second stage is shown, in two instances in Table VIII being propylene oxide and in one instance being ethylene oxide.

Bearing in mind what is said in regard to Example 1f being derived from Example 8c, which in turn was derived from Example 1b plus ethylene oxide, it should be noted that this table does not, as far as the first four columns go, reflect the amount of oxide which was added in the initial or earlier stage. As previously noted, this does not cause confusion and, in fact, permits holding the data to a minimum in light of what is said next.

Referring now to columns seven, eight, nine and ten which are concerned with composition at the end, it will be noted that these data do take into consideration the amount of oxide added initially as well as the oxide during the second stage. Thus, although this shows the propylene oxide added it also shows the original ethylene oxide as representing the two-to-one weight ratio based on the oxyethylation of the first stage. This can be stated perhaps more simply in the following way: On original examination the table shows that Example 1f was derived from Example 8c. As to the composition of Example 8c one need only note that in the seventh column it shows that 8.0 pounds of propylene oxide were added and the weight ratio to the oxyalkylation-susceptible compound Example 1b was two-to-one, but it also shows that the weight ratio of the ethylene oxide at the same stage was two-to-one. Thus, without even checking back to a prior table it is obvious the initial material, Example 8c, subjected to a second oxyalkylation step, consisted of a product in which 4 pounds of the oxyalkylation-susceptible compound were combined with 8 pounds by weight of ethylene oxide, prior to oxypropylation.

All the data in Tables VIII and IV are presented in the same way. We find this is the most simple and concise tabular presentation that yet has been developed after a considerable series of experimentations, and reports in table form. This is true even where three oxides were employed as for instance in Example 1g in Table IX. Example 1g was obtained from Example 4f in Table VIII. Example 4f, as indicated, was obtained by an oxypropylation of Example 1f, and Example 1f, as previously noted, was obtained from Example 8c. The preparation of Example 8c from Example 1b has been discussed in considerable detail in the previous text. Again it is to be noted that in the tables the ratios of the oxides to the initial product prior to oxyalkylation is shown so there is no question as to the composition of each example although considerable data have been presented in what is a comparatively condensed and readily understandable form.

Note what is said in regard to the color of the products in the tables. For most industrial purposes there is no objection to the color. The products can be decolorized by conventional procedure, using bleaching earths, filtering clays, charcoal, or the like. A trace or small amount of catalyst, if present, can be removed for most purposes by the mere addition of a comparable amount of hydrochloric acid or by any other suitable means.

TABLE V

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used, EtO, grams | Catalyst, NaOH, grams | Xylene solvent, grams | Oxide used, EtO, grams[2] | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1c | 1b | 12.0# | 0.0# | 1.2# | 12.0# | 2.0# | 1/6 | | | 10-15 | 130-135 | 1/4 | Amber liquid. |
| 2c | 1c | 12.0 | 2.0 | 1.2 | 12.0 | 4.0 | 1/3 | | | 10-15 | 130-135 | 1/4 | Do. |
| 3c | 2c | 12.0 | 4.0 | 1.2 | 12.0 | 6.0 | 1/2 | | | 10-15 | 130-135 | 1/2 | Do. |
| 4c | 3c | 12.0 | 6.0 | 1.2 | 12.0 | 8.0 | 3/4 | | | 10-15 | 130-135 | 3/4 | Light amber. |
| 5c | 4c | 12.0 | 8.0 | 1.2 | 12.0 | 12.0 | 1.0 | | | 10-15 | 130-135 | 3/4 | Do. |
| 6c | 5c | 12.0 | 12.0 | 1.2 | 12.0 | 18.0 | 1.5 | | | 10-15 | 130-135 | 1 | Do. |
| 7c | 6c | 12.0 | 18.0 | 1.2 | 12.0 | 24.0 | 2.0 | | | 10-15 | 130-135 | 1 | Straw colored liq. |
| 8c | 7c | 12.0 | 24.0 | 1.2 | 12.0 | 36.0 | 3.0 | | | 10-15 | 130-135 | 1 1/4 | Amber liquid. |
| 9c | 6b | 15.0 | 0.0 | 1.5 | 15.0 | 3.0 | 1/5 | | | 10-15 | 130-135 | 1/2 | Do. |
| 10c | 9c | 12.0 | 3.0 | 1.5 | 15.0 | 5.0 | 1/3 | | | 10-15 | 130-135 | 1/2 | Do. |
| 11c | 10c | 12.0 | 5.0 | 1.5 | 15.0 | 10.0 | 2/3 | | | 10-15 | 130-135 | 1 | Do. |
| 12c | 11c | 12.0 | 10.0 | 1.5 | 15.0 | 15.0 | 1 | | | 10-15 | 130-135 | 1 | Light amber liq. |
| 13c | 12c | 12.0 | 15.0 | 1.5 | 15.0 | 30.0 | 2 | | | 10-15 | 130-135 | 2 | Do. |
| 14c | 13b | 12.0 | 30.0 | 1.5 | 15.0 | 45.0 | 3 | | | 10-15 | 130-135 | 2 1/4 | Do. |
| 15c | 14b | 12.0 | 45.0 | 1.5 | 15.0 | 60.0 | 4 | | | 10-15 | 130-135 | 3 | Straw colored liq. |

[1] Oxyalkylation-susceptible compound.
[2] In some instances weights change from gram basis to pound basis. Such change in unit is obvious.

TABLE VI

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used PrO, grams | Catalyst, NaOH, grams | Xylene solvent, grams | Oxide used, grams[2] | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1d | 11b | 8.0# | 0.0# | 0.8# | 8.0# | 24.0# | | 3.0 | | 10-15 | 130-135 | 1 1/4 | Amber liquid. |
| 2d | 1d | 8.0 | 24.0 | 0.8 | 8.0 | 48.0 | | 6.0 | | 10-15 | 130-135 | 1 1/4 | Do. |
| 3d | 2d | 8.0 | 48.0 | 0.8 | 8.0 | 80.0 | | 10.0 | | 10-15 | 130-135 | 2 | Do. |
| 4d | 3d | 4.0 | 40.0 | 0.4 | 4.0 | 64.0 | | 16.0 | | 10-15 | 130-135 | 2 | Do. |
| 5d | 4d | 4.0 | 64.0 | 0.4 | 4.0 | 80.0 | | 20.0 | | 10-15 | 130-135 | 2 1/2 | Do. |
| 6d | 5d | 4.0 | 80.0 | 0.4 | 4.0 | 100.0 | | 25.0 | | 10-15 | 130-135 | 3 | Do. |
| 7d | 6d | 2.0 | 50.0 | 0.2 | 2.0 | 56.0 | | 28.0 | | 10-15 | 130-135 | 1 1/2 | Straw colored. |
| 8d | 7d | 2.0 | 56.0 | 0.2 | 2.0 | 60.0 | | 30.0 | | 10-15 | 130-135 | 1 | Amber liquid. |
| 9d | 16b | 10.0 | 0.0 | 1.0 | 10.0 | 40.0 | | 4.0 | | 10-15 | 130-135 | 2 | Do. |
| 10d | 9d | 10.0 | 40.0 | 1.0 | 10.0 | 80.0 | | 8.0 | | 10-15 | 130-135 | 2 | Do. |
| 11d | 10d | 10.0 | 80.0 | 1.0 | 10.0 | 100.0 | | 10.0 | | 10-15 | 130-135 | 2 1/2 | Do. |
| 12d | 11d | 5.0 | 50.0 | 0.5 | 5.0 | 75.0 | | 15.0 | | 10-15 | 130-135 | 1 3/4 | Do. |
| 13d | 12d | 5.0 | 75.0 | 0.5 | 5.0 | 100.0 | | 20.0 | | 10-15 | 130-135 | 2 | Do. |
| 14d | 13d | 2.5 | 50.0 | 0.25 | 2.5 | 62.5 | | 25.0 | | 10-15 | 130-135 | 2 1/4 | Do. |
| 15d | 14d | 2.5 | 62.5 | 0.25 | 2.5 | 75.0 | | 30.0 | | 10-15 | 130-135 | 3 | Straw colored liq. |

[1] Oxyalkylation-susceptible compound.
[2] In some instances weights change from gram basis to pound basis. Such change in unit is obvious.

TABLE VII

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used BuO, grams | Catalyst, NaOH, grams | Xylene solvent, grams | Oxide used, grams[2] | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1e | 1b | 20.0# | 0.0# | 2.0# | 20.0# | 20.0 | | | 1.0 | 10-15 | 140-145 | 2 | Amber liquid. |
| 2e | 1e | 20.0 | 20.0 | 2.0 | 20.0 | 40.0 | | | 2.0 | 10-15 | 135-140 | 2 3/4 | Do. |
| 3e | 2e | 20.0 | 40.0 | 2.0 | 20.0 | 60.0 | | | 3.0 | 10-15 | 130-135 | 3 | Do. |
| 4e | 3e | 20.0 | 60.0 | 2.0 | 20.0 | 80.0 | | | 4.0 | 10-15 | 130-135 | 3 | Light amber liq. |
| 5e | 4e | 20.0 | 80.0 | 2.0 | 20.0 | 100.0 | | | 5.0 | 10-15 | 130-135 | 3 1/2 | Do. |
| 6e | 6b | 18.0 | 0.0 | 1.8 | 18.0 | 18.0 | | | 1.0 | 10-15 | 140-145 | 2 | Amber liquid. |
| 7e | 6e | 18.0 | 18.0 | 1.8 | 18.0 | 36.0 | | | 2.0 | 10-15 | 130-135 | 2 1/2 | Do. |
| 8e | 7e | 18.0 | 36.0 | 1.8 | 18.0 | 45.0 | | | 2.5 | 10-15 | 130-135 | 3 | Do. |
| 9e | 8e | 18.0 | 45.0 | 1.8 | 18.0 | 54.0 | | | 3.0 | 10-15 | 130-135 | 3 | Do. |
| 10e | 9e | 18.0 | 54.0 | 1.8 | 18.0 | 72.0 | | | 4.0 | 10-15 | 130-135 | 3 | Do. |
| 11e | 16b | 14.5 | 0.0 | 1.5 | 14.5 | 16.0 | | | 1.1 | 10-15 | 135-140 | 2 1/2 | Do. |
| 12e | 11e | 14.5 | 16.0 | 1.5 | 14.5 | 29.0 | | | 2.0 | 10-15 | 135-140 | 2 1/2 | Do. |
| 13e | 12e | 14.5 | 29.0 | 1.5 | 14.5 | 36.2 | | | 2.5 | 10-15 | 135-140 | 2 | Do. |
| 14e | 13e | 14.5 | 36.2 | 1.5 | 14.5 | 43.5 | | | 3.0 | 10-15 | 130-135 | 2 | Do. |
| 15e | 14e | 14.5 | 43.5 | 1.5 | 14.5 | 58.0 | | | 4.0 | 10-15 | 130-135 | 3 3/4 | Do. |

[1] Oxyalkylation-susceptible compound.
[2] In some instances weights change from gram basis to pound basis. Such change in unit is obvious.

TABLE VIII

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used, as indicated, grams | Catalyst, NaOH, grams | Xylene solvent, grams | Oxide used, grams[2] | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1f | 8e | 4.0# | 0.0#PrO | 0.4# | 4.0# | 8.0#PrO | 2.0 | 2.0 | | 10-15 | 130-135 | 1½ | Straw colored liq. |
| 2f | 1f | 4.0 | 8.0 | 0.4 | 4.0 | 16.0 | 2.0 | 4.0 | | 10-15 | 130-135 | 1½ | Do. |
| 3f | 2f | 4.0 | 16.0 | 0.4 | 4.0 | 32.0 | 2.0 | 8.0 | | 10-15 | 130-135 | 2 | Do. |
| 4f | 3f | 4.0 | 32.0 | 0.4 | 4.0 | 48.0 | 2.0 | 12.0 | | 10-15 | 130-135 | 2¼ | Do. |
| 5f | 4f | 4.0 | 48.0 | 0.4 | 4.0 | 76.0 | 2.0 | 19.0 | | 10-15 | 130-135 | 2¾ | Pale straw liq. |
| 6f | 3d | 2.0 | 0.0EtO | 0.2 | 2.0 | 10.0EtO | 5.0 | 10.0 | | 10-15 | 130-135 | 1¾ | Straw colored liq. |
| 7f | 6f | 2.0 | 10.0 | 0.2 | 2.0 | 12.0 | 6.0 | 10.0 | | 10-15 | 130-135 | ½ | Do. |
| 8f | 7f | 2.0 | 12.0 | 0.2 | 2.0 | 14.0 | 7.0 | 10.0 | | 10-15 | 130-135 | ½ | Do. |
| 9f | 8f | 2.0 | 14.0 | 0.2 | 2.0 | 16.0 | 8.0 | 10.0 | | 10-15 | 130-135 | ¾ | Do. |
| 10f | 9f | 2.0 | 16.0 | 0.2 | 2.0 | 18.0 | 9.0 | 10.0 | | 10-15 | 130-135 | 1 | Pale straw liquid. |
| 11f | 10e | 4.5 | 0.0PrO | 0.45 | 4.5 | 18.0PrO | | 4.0 | 4.0 | 10-15 | 130-135 | 2 | Straw colored liq. |
| 12f | 11f | 4.5 | 18.0 | 0.45 | 4.5 | 36.0 | | 8.0 | 4.0 | 10-15 | 130-135 | 2 | Do. |
| 13f | 12f | 4.5 | 36.0 | 0.45 | 4.5 | 45.0 | | 10.0 | 4.0 | 10-15 | 130-135 | 2½ | Do. |
| 14f | 13f | 4.5 | 45.0 | 0.45 | 4.5 | 54.0 | | 12.0 | 4.0 | 10-15 | 130-135 | 3 | Do. |
| 15f | 14f | 4.5 | 54.0 | 0.45 | 4.5 | 90.0 | | 20.0 | 4.0 | 10-15 | 130-135 | 4 | Pale straw liquid. |

[1] Oxyalkylation-susceptible compound.
[2] In some instances weights change from gram basis to pound basis. Such change in unit is obvious.

TABLE IX

| Ex. No. | Composition before—Amount of OSC,[1] catalyst and solvent constant before and after oxyalkylation | | | | | Composition at end | | | | Operating conditions | | | End product—Color and physical state |
|---|---|---|---|---|---|---|---|---|---|---|---|---|---|
| | OSC[1] Ex. No. | OSC,[1] grams | Oxide used, as indicated, grams | Catalyst, NaOH, grams | Xylene solvent, grams | Oxide used, grams[2] | Weight ratio | | | Max. pres., p.s.i. | Max. temp., °C. | Time of reaction, hrs. | |
| | | | | | | | EtO to oxyalkylation suscept. cmpd. | PrO to oxyalkylation suscept. cmpd. | BuO to oxyalkylation suscept. cmpd. | | | | |
| 1g | 4f | 400 | 2.0BuO | 40 | 400 | 800BuO | 2.0 | 12.0 | 2.0 | 10-15 | 135-140 | 3 | Pale straw liq. |
| 2g | 1g | 400 | 800 | 40 | 400 | 1,200 | 2.0 | 12.0 | 3.0 | 10-15 | 135-140 | 2 | Do. |
| 3g | 2g | 200 | 600 | 20 | 200 | 800 | 2.0 | 12.0 | 4.0 | 10-15 | 135-140 | 1½ | Do. |
| 4g | 3g | 200 | 800 | 20 | 200 | 1,000 | 2.0 | 12.0 | 5.0 | 10-15 | 135-140 | 2 | Do. |
| 5g | 4g | 200 | 1,000 | 20 | 200 | 2,800 | 2.0 | 12.0 | 14.0 | 10-15 | 135-140 | 5 | Yellowish liquid. |
| 6g | 10f | 200 | 0.0BuO | 20 | 200 | 200BuO | 9.0 | 10.0 | 1.0 | 10-15 | 135-140 | 1 | Pale straw liquid. |
| 7g | 6g | 200 | 200 | 20 | 200 | 300 | 9.0 | 10.0 | 1.5 | 10-15 | 135-140 | 1¼ | Do. |
| 8g | 7g | 200 | 300 | 20 | 200 | 400 | 9.0 | 10.0 | 2.0 | 10-15 | 135-140 | 1¼ | Do. |
| 9g | 8g | 200 | 400 | 20 | 200 | 500 | 9.0 | 10.0 | 2½ | 10-15 | 135-140 | 1½ | Do. |
| 10g | 9g | 200 | 500 | 20 | 200 | 600 | 9.0 | 10.0 | 3.0 | 10-15 | 135-140 | 2 | Yellowish liquid. |
| 11g | 14f | 450 | 0EtO | 45 | 450 | 450EtO | 1.0 | 20.0 | 4.0 | 10-15 | 130-135 | 1 | Pale straw liquid. |
| 12g | 11g | 450 | 450 | 45 | 450 | 900 | 2.0 | 20.0 | 4.0 | 10-15 | 130-135 | 1½ | Do. |
| 13g | 12g | 225 | 450 | 22.5 | 225 | 900 | 4.0 | 20.0 | 4.0 | 10-15 | 130-135 | 1¾ | Do. |
| 14g | 13g | 225 | 900 | 22.5 | 225 | 1,125 | 5.0 | 20.0 | 4.0 | 10-15 | 130-135 | 1¾ | Do. |
| 15g | 14g | 225 | 900 | 22.5 | 225 | 2,025 | 9.0 | 20.0 | 4.0 | 10-15 | 130-135 | 2½ | Yellowish liquid. |

[1] Oxyalkylation-susceptible compound.
[2] In some instances weights change from gram basis to pound basis. Such change in unit is obvious.

PART 5

As to the use of conventional demulsifying agents reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example 7c in the present case.

PART 6

The products described in part 5 have utility in at least two distinct ways—the products as such, or in the form of some simple derivative, such as the salt which can be used in numerous arts subsequently described. Also, the products can serve as initial materials for more complicated reactions of the kind previously mentioned, to wit, they may be subjected to oxyalkylation, particularly oxyethylation, or oxypropylation or oxybutylation to give products which are not only valuable for the purpose described in regard to the parent material or the salts of the parent material, but also for other purposes. Likewise, since the tertiary amino nitrogen atom is present the products can readily be reacted with suitable reactants such as chloroacetic acid esters, benzylchloride, alkyl halides, esters of sulfonic acids, methyl sulfate, or the like, to give quaternary ammonium compounds which are used, not only for the purposes herein described, but also for various other uses.

In such instances where the amine contains a hydroxyl group the product is susceptible to reactions involving the hydroxyl radical, particularly acylation reactions, etc., i.e., reactions involving the use of either monocarboxy acids which may be low molal or high molal, and polycarboxy acids of the kind previously enumerated.

The products herein described as such prepared in accordance with this invention can be used as emulsifying agents, for oils, fats and waxes, as ingredients in insecticides compositions, or as detergents and wetting agents in the laundering, scouring, dyeing, tanning and mordanting industries. They also may be used for preparing boring or metal-cutting oils and cattle dips, as metal pickling inhibitors, and for pharmaceutical purposes.

Other uses include the preparation or resolution of petroleum emulsions, whether of the water-in-oil type or oil-in-water type. They may be used as additives in connection with other emulsifying agents; they may be employed to contribute hydrotropic effects; they may be used as antistrippers in connection with asphalts. They may be used to prevent corrosion, particularly the corrosion of ferrous metals for various purposes and particularly in connection with the production of oil and gas, and also in refineries where crude oil is converted into various commercial products. The products may be used industrially to inhibit or stop microorganic growth or other objectionable lower forms of life, such as the growth of algae, or the like; they may be used to inhibit the growth of bacteria, molds, etc.; they are valuable additives to lubricating oils, both these derived from petroleum and synthetic lubricating oils, and also to hydraulic brake fluids of the aqueous or nonaqueous type. Some have definite anti-corrosive action. They may be used in connection with other processes where they are injected into an oil or gas well for the purpose of removing a mud sheath, increasing the ultimate flow or fluid from the surrounding strata, and particularly in the secondary recovery operations using aqueous flood waters. They may be used also in dry cleaners' soaps.

With regard to the above statements, reference is made particularly to the use of the materials as such, or in the form of a salt; the salt form refers to a salt involving either one or both basic nitrogen atoms. Obviously, the salt form involves a modification in which the hydrophile character can either be increased or decreased and, inversely, the hydrophobe character can be decreased or increased. For example, neutralizing the product with practically any low molal acid, such as acetic acid, hydroxyacetic acid, lactic acid, or nitric acid, is apt to markedly increase the hydrophile effect. One may also use acids of the type

R—O—CH$_2$—CH$_2$—O—CH$_2$—CH$_2$—O—CH$_2$—COOH in which R is a comparatively small alkyl radical, such as methyl, ethyl or propyl. The hydrophile effect may be decreased and the hydrophobe effect increased by neutralization with a monocarboxy detergent-forming acid. These are acids which have at least 8 and not more than 32 carbon atoms. They are obtained from higher fatty acids and include also resin acids such as abietic acid, and petroleum acids such as naphthenic acids and acids obtained by the oxidation of wax. One can also obtain new products having unique properties by combination with polybasic acids, such as diglycolic acid, oxalic acid, dimerized acids from linseed oil, etc. The most common examples, of course, are the higher fatty acids having generally 10 to 18 carbon atoms. I have found that a particularly valuable anti-corrosive agent can be obtained from any suitable resin and formaldehyde provided the secondary amine is hydroxyethyl cyclohexylamine. The corrosion inhibiting properties of this compound can be increased by neutralization with either one or two moles of an oil-soluble sulfonic acid, particularly a sulfonic acid of the type known as mahogany sulfonic acid.

I have found the products herein described are of unusual utility for preventing the separation of sludge in fuel oil during storage.

These products are also valuable as antioxidants for use in gasoline and various fuels in ratios of 10 to 50 p.p.m.

The herein described products and the derivatives thereof are particularly valuable in flooding processes for recovery of oil from subterranean oil-bearing strata when employed in the manner described in U.S. Patent No. 2,233,381, dated February 25, 1941, to De Groote and Keiser.

See also my co-pending application, Serial No. 651,848, filed April 10, 1957.

Having thus described my invention, what I claim as new and desire to secure by Letters Patent is:

1. A two-step manufacturing process consisting of first, condensing (a) an oxyalkylation-susceptible, fusible, organic solvent-soluble, water-insoluble, low-stage phenol-aldehyde resin having an average molecular weight corresponding to at least 3 and not over 6 phenolic nuclei per resin molecule wherein one phenolic nucleus is a bisphenol nucleus and the other phenolic nuclei are alkyl phenol nuclei; said resin being derived by reaction between an aldehyde having not over 8 carbon atoms and a mixture composed of two types of phenols, one being (A) a phenol of the formula in which R is an aliphatic hydrocarbon radical having at least 4 and not more than 24 carbon atoms and substituted in the 2,4,6 position; the other being (B) a bisphenol nuclearly tetrafunctional with respect to aldehydes, containing from 13 to 23 carbon atoms and composed exclusively of carbon, hydrogen and oxygen atoms; the molar ratio of the two types of phenols in the mixture reacted with the aldehyde being so as to contribute one bisphenol nucleus per resin molecule;

(b) a basic secondary amine composed only of carbon, hydrogen, oxygen and nitrogen atoms free from any primary amino radical, having up to 32 carbon atoms and reactive towards formaldehyde, the nitrogen atom of the secondary amine being directly attached by single bonds to two different carbon atoms neither of which is a member of an aromatic ring;

(c) formaldehyde; said condensation reaction being conducted at a temperature sufficiently high to eliminate water and below the pyrolytic point of the reactants and resultants of reaction; the molar ratio of reactants (a), (b) and (c) being approximately within the range of 1:3:3 to 1:4:4 respectively; and the resinous condensation product resulting from the process being heat-stable and oxyalkylation-susceptible; followed by a second step of reacting said condensate with from one-half to fifty times by weight of an alpha-beta alkylene oxide having not more than 4 carbon atoms and selected from the class consisting of ethylene oxide, propylene oxide, butylene oxide, glycide and methylglycide.

2. The process of claim 1 in which the basic secondary amine reactant (b) has an alkanol radical attached to one secondary amino nitrogen atom.

3. A two-step manufacturing process consisting of first, condensing (a) an oxyalkylation-susceptible, fusible, organic solvent-soluble, water-insoluble, low-stage phenol-aldehyde resin having an average molecular weight corresponding to at least 3 and not over 5 phenolic nuclei per resin molecule wherein one phenolic nucleus is a bisphenol nucleus and the other phenolic nuclei are alkyl phenol nuclei; said resin being derived by reaction between formaldehyde and a mixture composed of two types of phenols, one being (A) a phenol of the formula in which R is an aliphatic hydrocarbon radical having at least 4 and not more than 14 carbon atoms and substituted in the 2,4,6 position; the other being (B) a bisphenol nuclearly tetrafunctional with respect to aldehydes, containing from 13 to 23 carbon atoms and composed exclusively of carbon, hydrogen and oxygen atoms; the molar ratio of the two types of phenols in the mixture reacted with the aldehyde being so as to contribute one bisphenol nucleus per resin molecule;

(b) a basic hydroxylated secondary amine composed only of carbon, hydrogen, oxygen and nitrogen atoms free from any primary amino radical, having up to 32 carbon atoms, having two to four alkanol radicals which in turn have not over 8 carbon atoms in any alkanol radical and reactive towards formaldehyde, the nitrogen atom of the secondary amine being directly attached by single bonds to two different carbon atoms neither of which is a member of an aromatic ring;

(c) formaldehyde; said condensation reaction being conducted at a temperature within the range of about 90° to 160° C.; the molar ratio of reactants (a), (b) and (c) being approximately 1:4:4 respectively, the condensation reaction being carried out while the reactants (a), (b) and (c) are in admixture with an inert solvent, and the resinous condensation product resulting from the process being heat-stable and oxyalkylation-susceptible; followed by a second step of reacting said condensate with from one-half to fifty times by weight of an alpha-beta alkylene oxide having not more than 4 carbon atoms and selected from the class consisting of ethylene oxide, propylene oxide, butylene oxide, glycide and methyl glycide.

4. The product resulting from the manufacturing process defined in claim 1.

5. The product resulting from the manufacturing process defined in claim 3.

References Cited in the file of this patent

UNITED STATES PATENTS

| | | |
|---|---|---|
| 2,031,557 | Bruson | Feb. 18, 1936 |
| 2,330,217 | Hunn | Sept. 28, 1943 |
| 2,564,191 | De Groote et al. | Aug. 14, 1951 |
| 2,679,485 | De Groote | May 25, 1954 |
| 2,695,888 | De Groote | Nov. 30, 1954 |